(12) United States Patent
Heilig et al.

(10) Patent No.: US 6,888,289 B2
(45) Date of Patent: May 3, 2005

(54) MULTI-AXES, SUB-MICRON POSITIONER

(75) Inventors: John Andrew Heilig, Santa Clara, CA (US); Bahram Berj Kafai, Granada Hills, CA (US); Glenn Sterling Trammell, Valencia, CA (US)

(73) Assignee: Baldor Electric Company, Fort Smith, AR (US)

( * ) Notice: Subject to any disclaimer, the term of this patent is extended or adjusted under 35 U.S.C. 154(b) by 0 days.

(21) Appl. No.: 10/198,666

(22) Filed: Jul. 16, 2002

(65) Prior Publication Data

US 2004/0012305 A1 Jan. 22, 2004

(51) Int. Cl.[7] .................................................. H02N 2/00
(52) U.S. Cl. .................................. 310/323.17; 310/328
(58) Field of Search .................... 310/12–14, 323.17, 310/328

(56) References Cited

U.S. PATENT DOCUMENTS

| | | | |
|---|---|---|---|
| 4,516,253 A | 5/1985 | Novak | 378/34 |
| 4,525,852 A | 7/1985 | Rosenberg | 378/34 |
| 4,723,086 A | 2/1988 | Leibovich et al. | 310/328 |
| 4,887,804 A | 12/1989 | Ohtsuka | 269/73 |
| 4,917,462 A * | 4/1990 | Lewis et al. | 359/368 |
| 4,948,330 A | 8/1990 | Nomura et al. | 414/749 |
| 5,120,034 A | 6/1992 | Van Engelen et al. | 269/73 |
| 5,160,877 A * | 11/1992 | Fujiwara et al. | 318/568.21 |
| 5,418,771 A * | 5/1995 | Kasanuki et al. | 369/126 |
| 5,705,878 A | 1/1998 | Lewis et al. | 310/328 |
| 5,798,927 A * | 8/1998 | Cutler et al. | 700/188 |
| 5,996,437 A | 12/1999 | Novak et al. | 74/490.09 |
| 6,252,333 B1 * | 6/2001 | Iino et al. | 310/323.17 |
| 6,310,342 B1 | 10/2001 | Braunstein et al. | 250/306 |
| 6,346,710 B1 | 2/2002 | Ue | 250/442.11 |
| 6,350,080 B1 * | 2/2002 | Do et al. | 403/381 |
| 6,437,463 B1 * | 8/2002 | Hazelton et al. | 310/12 |
| 6,509,957 B1 * | 1/2003 | Tanaka | 355/72 |
| 2003/0034695 A1 * | 2/2003 | Binnard et al. | 310/12 |

FOREIGN PATENT DOCUMENTS

| | | | |
|---|---|---|---|
| JP | 63-244205 | * 10/1988 | 310/328 |
| JP | 1-303361 | * 12/1989 | 310/328 |

* cited by examiner

*Primary Examiner*—Thomas M. Dougherty
(74) *Attorney, Agent, or Firm*—Thompson Coburn LLP

(57) ABSTRACT

A positioner for positioning an object with sub-micron resolution is disclosed. The positioner includes a first stage having a first stage housing and adapted to provide dual-axis motion for coarse positioning of the object, and a second stage secured substantially within the first stage housing and adapted to provide dual-axis motion for fine positioning of the object. The second stage comprises a second stage housing on which the object may be removably secured. The first stage is preferably a stepper motor or servo motor and the second stage is a piezoelectric actuator. The first stage housing preferably includes air bearings positioned on a surface thereof.

11 Claims, 5 Drawing Sheets

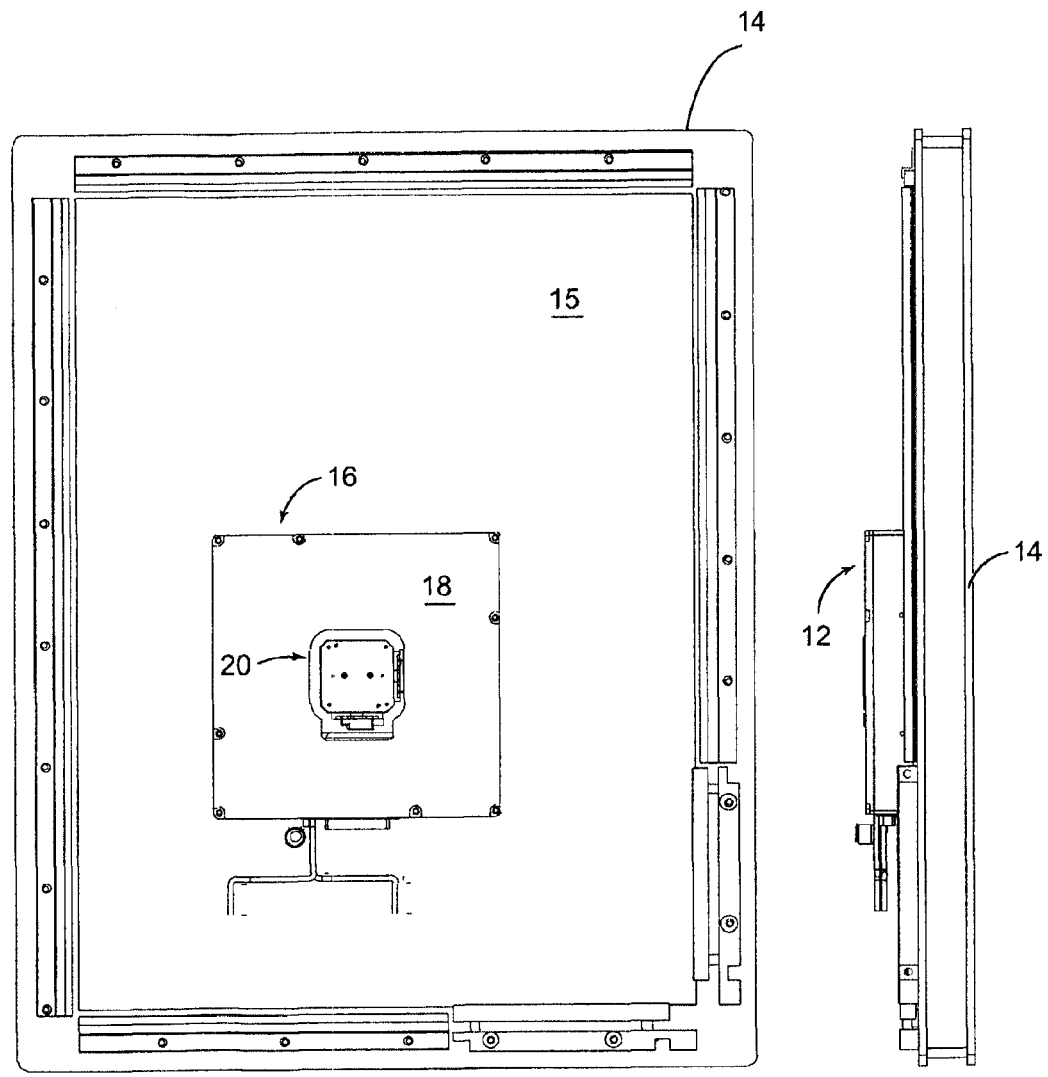
Figure 2
Figure 4
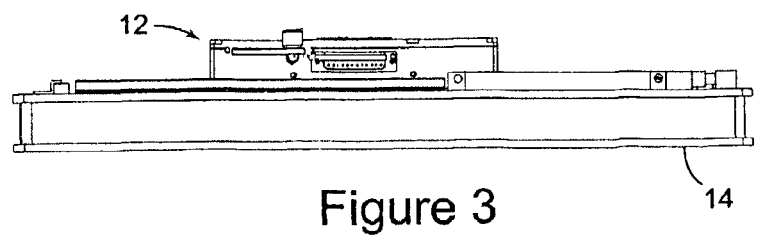
Figure 3

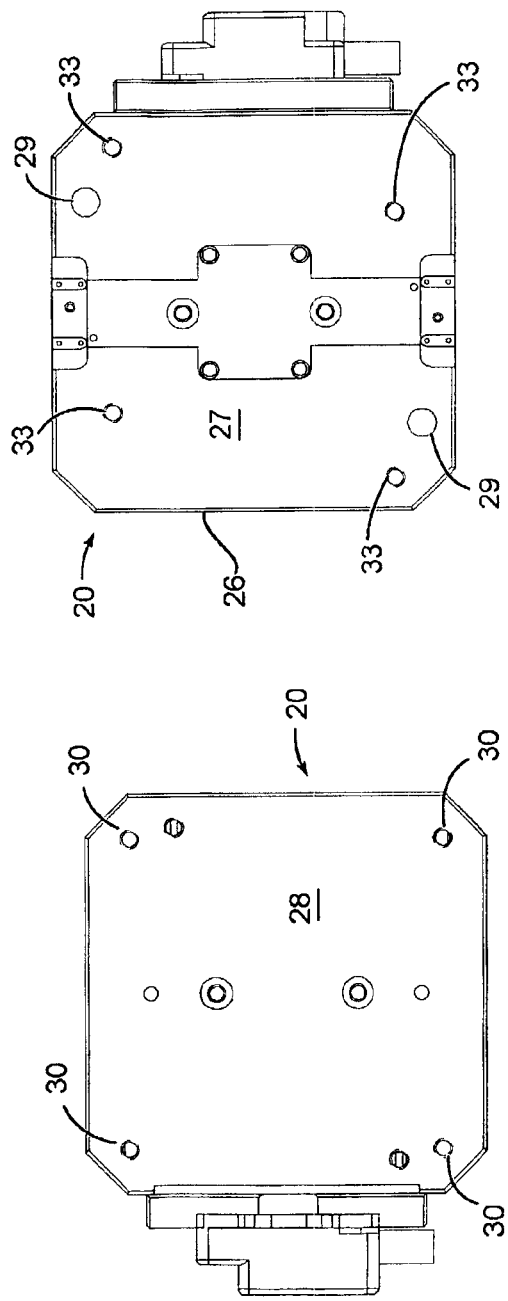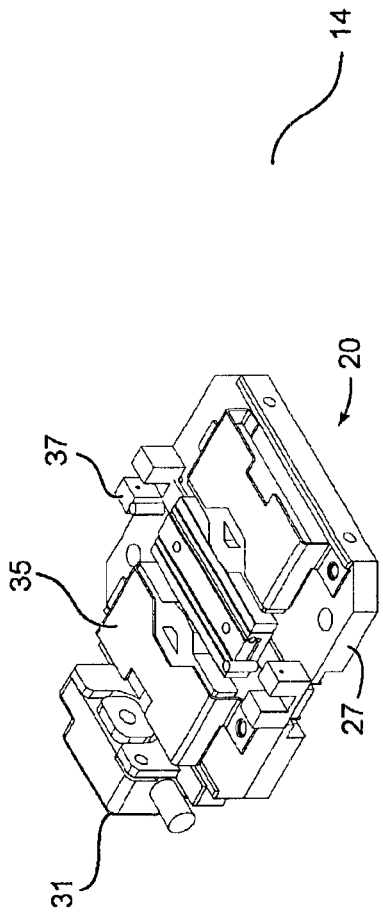

MULTI-AXES, SUB-MICRON POSITIONER

BACKGROUND OF THE INVENTION

The present invention relates generally to motion control systems and in particular, to a multi-axes, positioner having sub-micron resolution.

Motion control technology requires precision, speed and accuracy. Several years ago, systems able to position to 10 micro inches (10 millionths of an inch) were considered state-of-the-art. Mechanical limits of current motion control designs, however, inhibit the ability to provide precise, quick and accurate positioning in the nanometer and sub-nanometer range. Nevertheless, today companies routinely require the ability to position to fractions of a micron for such applications as semiconductor tool design, disk-drive testing, fiber-optics equipment, lithography, line-width metrology and nanometer-scale development to name a few.

Today's motion control systems are made up of a number of components that typically include one or more stages, drive mechanisms, encoders and control electronics. A stage is a mechanical device that produces a linear translation, either by conversion of rotary motion or by linear motors directly. It typically consists of three main components: a stationary member or base, a moving member, and a carriage, which generally includes bearings. The base is designed to support a load and carry the bearings on which the carriage travels. The carriage is attached to the drive mechanism, which causes it to move along the base. Several mechanical and electrical types of drive mechanisms exist. These include manual, pneumatic, hydraulic, rack and pinion, lead screw, belt and pulleys, linear type motors (cog-free, iron core, DC brushed servo motors and linear steppers), voice coils, and rotary type stepper or servomotors.

While such drive mechanisms are adequate for coarse positioning, they are typically not suited for positioning that requires fine, accurate and fast movement. A piezoelectric motor-driven stage is often used on top of a pre-existing stage to provide for such movement. Piezoelectric motors have many advantages over conventional magnetic motors. These advantages include high precision, repeatable nanometer and sub nanometer-size steps, quick response (they are one of the fastest responding positioning elements currently available), and no wear and tear because of their solid-state structure. Thus, by combining the use of a magnetic motor-driven stage with a piezoelectric motor-driven stage, the motion control system can move with the former into a coarse position to achieve long travels, and then with the latter for final sub-nanometer moves.

The use of stacked stages, however, presents problems. Not only does such stacking add to the height of the system, but it's cost as well. As the height of the system increases, so does the risk of vibration, which reduces the accuracy and precision of the system. This problem is exacerbated in the case of dual-axis systems that require two times the height of single axis systems. Moreover, stacked stages increase the risk of abby errors (i.e., rolling, pitching and yawing). Further, in some applications when extremely straight motion or multi-axis motion is required, stacked stages alone are not sufficient to perform complex tasks.

As a result, there is a need for a cost-effective, multi-axes, single story positioner that provides for fine positioning in the sub-micron range.

BRIEF SUMMARY OF THE INVENTION

It is in view of the above problems that the present invention was developed. The invention is directed to a multi-axes, sub-micron positioner for the positioning of an object. The positioner comprises a first stage having a first stage housing and adapted to provide dual-axis motion for coarse positioning of the object, and a second stage secured substantially within the first stage housing of the first stage and adapted to provide dual-axis motion for fine positioning of the object, whereby four axes of motion are achieved. The second stage comprises a second stage housing on which the object may be removably secured. The first stage comprises a first motor and the second stage comprises a piezoelectric actuator. In a preferred embodiment, the first motor is a stepper motor or servo motor, and the dual-axis motion of the first and second stages is in an x and y direction. The first stage housing comprises a surface having bearings, preferably air bearings, positioned thereon. The housing may further comprise a position feedback device connector adapted to connect a position feedback device thereto, and an air supply connector adapted to connect an air supply for supplying air to the air bearings.

A motion control system for positioning an object with sub-micron resolution is also disclosed. The system comprises a base, and a positioner as set described above adapted for movement on the base.

A method of making a positioner as described above is also disclosed. The method comprises housing a first stage having dual-axis motion within a first stage housing, and securing a second stage having dual-axis motion substantially within the first stage housing of the first stage.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 2 is a top plan view of the motion control system of FIG. 1;

FIG. 3 is a front side view of the motion control system of FIG. 1;

FIG. 4 is a right side view of the motion control system of FIG. 1;

FIG. 7 is a top plan view of the second stage of FIG. 1;

FIG. 8 is a bottom plan view of the second stage of FIG. 1; and

FIG. 9 is a top plan view of the second stage of FIG. 1 with part of its housing removed.

DETAILED DESCRIPTION OF THE INVENTION

Figure 1:
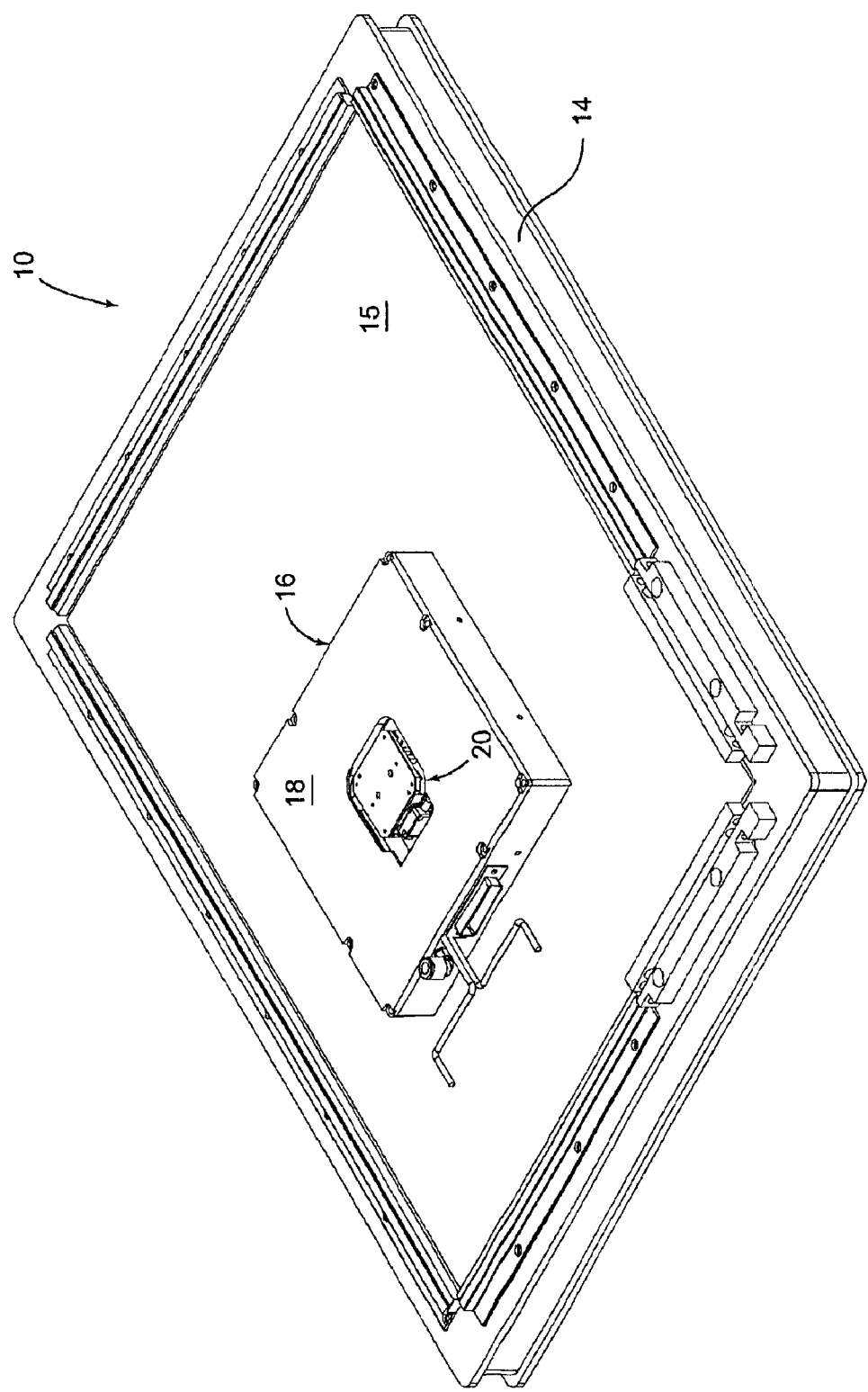
FIG. 1 is a perspective view of a motion control system in accordance with one embodiment of the present invention.

FIG. 1 shows a perspective view of a portion of a motion control system 10 in accordance with one embodiment of the present invention. The system 10 includes a positioner 12 and a base 14 that provides a stable and flat platform on which to move the positioner 12. The base 14 is preferably stationary and may be made from a variety of materials including without limitation aluminum, steel, ceramic, honeycomb or granite plate. A platen 15 made up of a photochemically etched steel plate that is filled with epoxy and ground flat is preferably bonded to the base 14. The base can be any size depending on the application for which the positioner is being used, but typically ranges up to 914×1498 mm.

Figure 5:
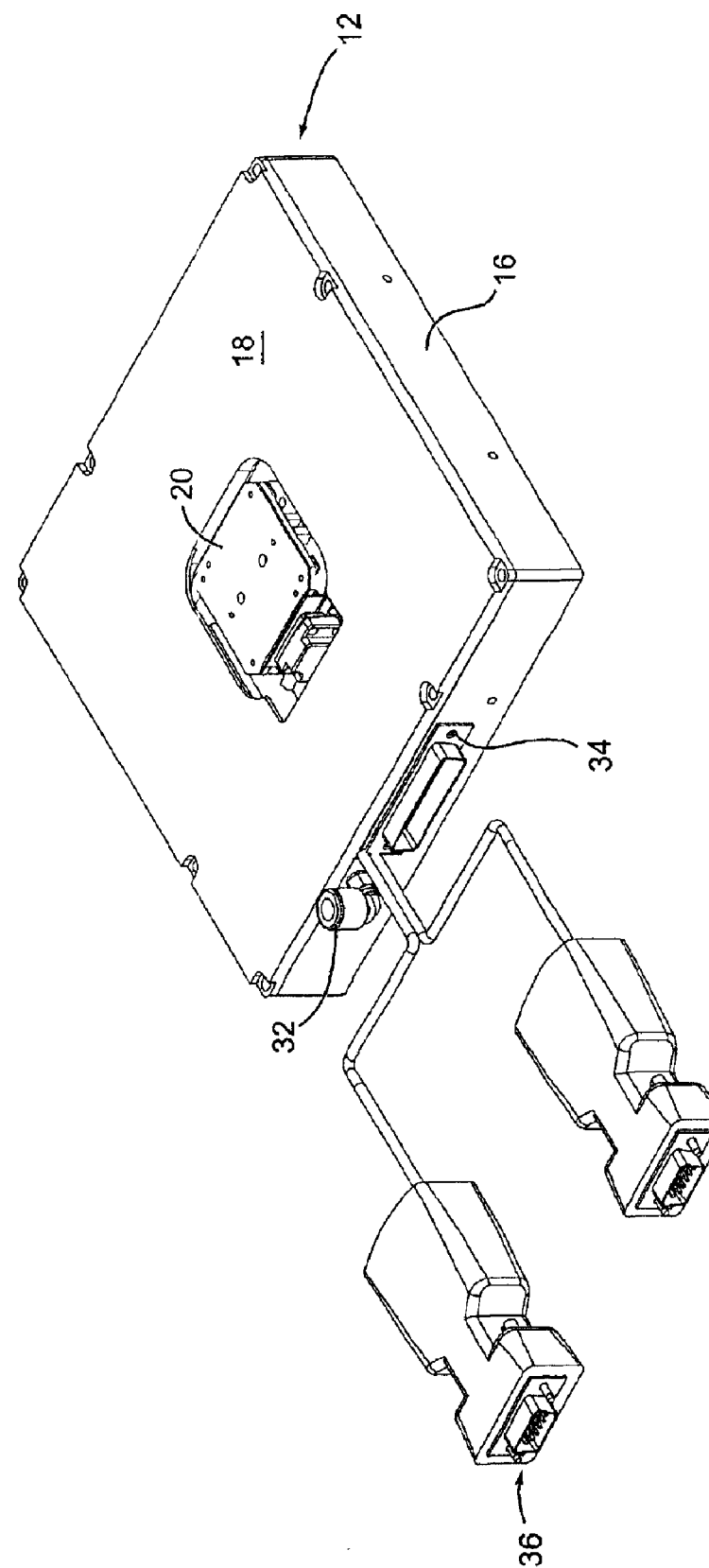
FIG. 5 is a top perspective view of one embodiment of the positioner of FIG. 1.

With further reference to FIG. 5, the positioner 12 comprises a first stage 16 having a housing 18, and a second stage 20 secured substantially within an aperture of the housing 18 of the first stage so as to produce an essentially single story positioner. In one embodiment, the housing 18 includes a bottom surface having an inside surface beneath the aperture which includes threaded holes (also not shown) for receiving screws for securing the second stage 20 within the housing 18 as further described herein. It can be appreciated, however, that any type of mechanism for removably or fixedly securing the second stage 20 within housing 18 may be used, and that the first stage 16 and second stage 20 can be two separate components or a single, integral component.

In a preferred embodiment, the positioner 12 has a height not exceeding 1.2 inches. The housing 18 is preferably made of a hard, anodized aluminum, and small in size (e.g., 7.0 inches square for the housing shown in the figures). While the shape of the housing 18 shown in the figures is a square, it can be appreciated that any shaped housing may be used.

First stage 16 is preferably a linear stepper motor (such as a Baldor dual-axis stepper motor (Model No. 1304)). It can be appreciated, however, that other types of motors capable of moving the first stage 12 on the base 14, such as servo motors, may also be used. As is further shown in FIG. 6, first stage 16 consists of a plurality of magnetic stacks 22, preferably four (4) to eight (8), with half the stacks mounted orthogonally to each other. Such a configuration allows the first stage 16 to have dual-axis motion in an X and Y direction. The magnetic flux passing between the first stage 16 and base 14 gives rise to a very strong force of attraction there between. The positioner 12 can thus produce a holding force at any position along the base 14. This holding force helps to isolate any mechanical vibration, which allows the second stage 20 to measure in sub-micron ranges. When current is established in a field winding of a magnetic stack 22, the resulting magnetic field tends to reinforce permanent magnetic flux at one pole face and cancel it at the other. By reversing the current, the reinforcement and cancellation are exchanged. The position of the first stage 16 thus depends on which coil is energized and its polarity.

Figure 6:
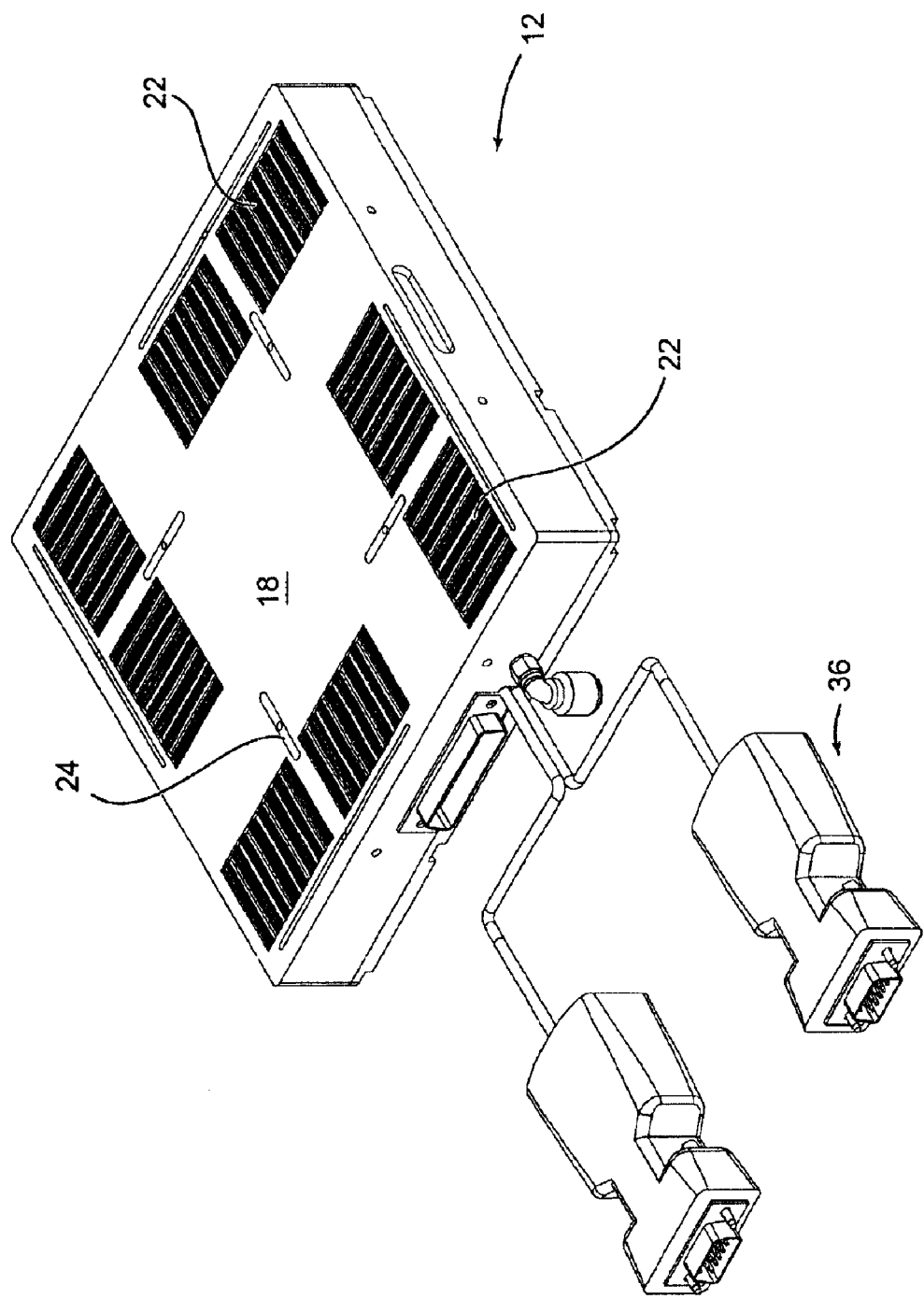
FIG. 6 is a bottom perspective view of the positioner of FIG. 5.

As shown in FIG. 6, the first stage 16 includes bearings 24 positioned on the outside surface of the bottom surface of the housing 14. The bearings 24 may manifest themselves in a variety of shapes and configurations including without limitation magnetic, hydrostatic and air bearing. In a preferred embodiment, bearings 24 are air bearings given that they offer excellent smoothness and accuracy of position with no friction, wear or maintenance and that their life is unlimited when operated properly. As air has a low viscosity, there is zero static and zero dynamic friction, thereby allowing the positioner 12 to exhibit good shock and vibration resistance. The air-bearing surface preferably floats on 45 to 60 psi of filtered air at a height of less than 0.001 inch.

The first stage 16 provides for coarse open loop positioning in the range of 1 micron to 500 microns and at speeds of up to 40 inches per second with up to 2 g's of acceleration. The size of the first stage 16 may vary depending on the force requirements of the particular application for which the positioner 12 is being used. In a preferred embodiment, the first stage 16 is equipped to handle forces from 2 to 80 pounds in each axis of motion, and can position an object with a resolution of about 5 microns (0.0002 inch), although accuracy can be improved with mapping the base 14.

The second stage 20 is a piezoelectric actuator that operates using solid-state piezoelectric ceramic crystals (not shown). It can be of any type, such as an inchworm, vibrating element (such as EDO Corporation's PDM 30 piezoelectric actuator), or stacked element type. The piezoelectric effect exhibited by ceramic crystals causes the ceramic to expand and contract as electric field is applied across the polarized electrodes of crystal. The expansion and contraction under an alternating electric field causes a controlled, sinusoidal vibration. This vibration drives a friction strip shoe that is coupled to a flat friction strip (both also not shown), providing well-controlled linear motion for the motor. Each vibration cycle produces a small step, as small as a few nanometers. The accumulation of these steps at a rate of 130,000 steps per second allows the motor to travel at speeds of up to 12 inches per second. The second stage 20 provides for dual-axis motion of the positioner 12 of about 10 mm in both the X and Y direction.

The piezoelectric actuator is comprised of two housings, one of which is rotated ninety (90) degrees from the other to provide for dual-axis motion. Referring to FIGS. 7 and 8, a top housing 26 is shown having a top surface 28 to which an object may be removably secured. In one embodiment, the top surface 28 includes a plurality of holes 30 for removably securing the object thereto. It can be appreciated, however, that any type of mechanism for securing the object to the housing 26 of the second stage 20 may be used. The housing 26 further includes a bottom surface 27 for securing the first stage 20 within the housing 18 of first stage 16. In a preferred embodiment, the bottom surface 27 includes holes 29 through which screws can be passed for threadingly engaging the holes on the inside surface of the bottom surface of housing 18. Again, it can be appreciated that any type of mechanism may be used to removably or fixedly secure the second stage 20 within the housing 18, and that the first stage 16 and second stage 20 can be two separate components or a single integral component.

The bottom surface of the housing 27 may also include holes 33 for mounting the piezoelectric actuator thereto, as well as holes (not shown) for mounting the housing 27 to the housing beneath it (not shown). As shown in FIG. 9, the piezoelectric actuator comprises two piezoelectric motors 35 and two limit switches 37. A position feedback device 31 is preferably connected to the housing 27 of the second stage 20. Without such a feedback device, temperature changes and noise resulting from the mechanical and electronic components making up the positioner 12 can cause vibrations that make sub-micron measurements useless if not isolated adequately. The position feedback device 31 is integrated into the motion control system 10 and works together with a controller (not shown) and the positioner 12 to provide for closed loop fine positioning of the second stage 20 within the sub-micron range.

Optical encoders, whether analog or digital, are the widely preferred position feedback devices used today in motion control systems for semiconductor equipment, automation equipment, measurement tools, and many other positioning applications. An encoder generates signals in a digital or analog form that represent position data. The encoder optics technology is based on physical optics that detect the interference between diffraction orders to produce nearly perfect sinusoidal signals. Using a laser light source, the beam is reflected off a grating that diffracts the light into discrete orders, with the 0th and all even orders suppressed by the grating construction. With the 0 order suppressed, a region exists beyond the diverging 3rd order where only the ±1st orders overlap to create a nearly pure sinusoidal interference. A photo detector array produces four channels of nearly pure sinusoidal output when there is relative motion between the grating and the detector.

The sinusoidal signals are electronically interpolated to allow detection of displacement that is only a fraction of the optical fringe period. The encoder electronics amplify, normalize, and interpolate the output to the desired level of resolution. Unique signal processing technology corrects for gain, phase, and offset errors resulting in improved system performance. High-speed field programmable gate array signal processing combined with advanced data processing algorithms yield more accuracy and resolution at faster data output rates.

The housing 18 of positioner 12 includes an air supply connector 32 for supplying air to the bearings 24, and a power connector 34 for supplying power to the positioner 12. The air supply connector 32 and power connector 34 are preferably positioned on a side of the housing 18 so as not to impede with the movement of the positioner 12 on the base 14. The positioner 12 also preferably includes a position feedback connector 36 to which the position feedback device 31 is connected so that the second stage 20 can fine position with sub-micron resolution, preferably of less than 50 nanometers per step. The position feedback connector 36 is also preferably positioned on a side of the housing 18 so as not to impede with the movement of the positioner 12 on the base 14.

With such a configuration, the positioner 12 provides four axes of motion; a dual-axis first stage 16 for coarse positioning and dual-axis second stage 16 for fine positioning within the sub-micron range. The positioner 12 also has no moving parts, and can operate upside down. It is designed for small and light-load objects and given the accuracy, precision and stability of the positioner 12, it is ideal for numerous applications such as wafer inspection, line-width metrology, lithography, phase-shift, medical, semiconductor, fiber optics, and nanometer-scale development.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

We claim:

1. A motion control system for positioning an object with sub-micron resolution, comprising:
   a base; and
   a positioner adapted for movement on the base, the positioner comprising a first stage having a first stage housing and adapted to provide dual-axis motion for coarse positioning of the object, and a second stage secured substantially within the first stage housing and adapted to provide dual-axis motion for fine positioning of the object.

2. The motion control system of claim 1, wherein the second stage comprises a second stage housing on which the object may be removably secured.

3. The motion control system of claim 1, wherein the first stage comprises a first motor and the second stage comprises a piezoelectric actuator.

4. The motion control system of claim 3, wherein the first motor is a stepper motor.

5. The motor control system of claim 3, wherein the first motor is a servo motor.

6. The motion control system of claim 3, wherein the dual-axis motion of the first and second stages is in an x and y direction.

7. The motion control system of claim 3, wherein the first stage housing comprises a surface having bearings positioned thereon.

8. A motion control system for positioning an object with sub-micron resolution, comprising:
   a base; and
   a positioner adapted for movement of the base, the positioner comprising a first stage having a first stage housing and adapted to provide dual-axis motion for coarse positioning of the object, the first stage housing comprising a surface having bearings positioned thereon, and a second stage secured substantially within the first stage housing and adapted to provide dual-axis motion for first positioning of the object, the second stage comprising a piezoelectric actuator.

9. The motion control system of claim 3, wherein the housing further comprises a position feedback device connector adapted to connect a position feedback device thereto.

10. The motion control system of claim 8, wherein the housing further comprises an air supply connector adapted to connect an air supply for supplying air to the air bearings.

11. The motion control system of claim 1, wherein the positioner has a height of no more than approximately 1.2 inches.

* * * * *